US009455422B2

(12) United States Patent
Iwasaki et al.

(10) Patent No.: US 9,455,422 B2
(45) Date of Patent: Sep. 27, 2016

(54) RECTANGULAR BATTERY

(75) Inventors: Mizuo Iwasaki, Osaka (JP); Kenji Saruwatari, Tokushima (JP); Kazuhiko Watanabe, Tokushima (JP); Shinpei Yamagami, Tokushima (JP); Yasushi Nakagiri, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 14/235,432

(22) PCT Filed: May 7, 2012

(86) PCT No.: PCT/JP2012/002994

§ 371 (c)(1),
(2), (4) Date: Jan. 27, 2014

(87) PCT Pub. No.: WO2013/031056

PCT Pub. Date: Mar. 7, 2013

(65) Prior Publication Data

US 2014/0154544 A1 Jun. 5, 2014

(30) Foreign Application Priority Data

Aug. 31, 2011 (JP) ................................ 2011-188421
Nov. 30, 2011 (JP) ................................ 2011-261412

(51) Int. Cl.
*H01M 2/02* (2006.01)
*H01M 2/04* (2006.01)
(Continued)

(52) U.S. Cl.
CPC ............ *H01M 2/02* (2013.01); *H01M 2/0426* (2013.01); *H01M 2/0473* (2013.01);*H01M 2/0486* (2013.01); *H01M 2/1241* (2013.01); *H01M 2/347* (2013.01); *H01M 10/0431* (2013.01); *H01M 2/263* (2013.01); *H01M 2200/20* (2013.01)

(58) Field of Classification Search
CPC .. H01M 2/02; H01M 2/0426; H01M 2/0473; H01M 2/0486; H01M 2/1241; H01M 2/347; H01M 2/263; H01M 10/0431
See application file for complete search history.

(56) References Cited

U.S. PATENT DOCUMENTS 4,610,370 A * 9/1986 Patterson .............. B65D 83/70 220/203.08
4,698,282 A * 10/1987 Mantello ............ H01M 2/1241 220/203.08
(Continued)

FOREIGN PATENT DOCUMENTS

JP 11-073941 A 3/1999
JP 2010-003690 A 1/2010
JP 2011-035653 A 2/2011

OTHER PUBLICATIONS

International Search Report issued in PCT/JP2012/002994, dated May 29, 2012, with partial English translation, 5 pages.

*Primary Examiner* — Kenneth Douyette
(74) *Attorney, Agent, or Firm* — McDermott Will & Emery LLP

(57) ABSTRACT

Disclosed is a rectangular battery in which an electrode group formed by winding a first electrode and a second electrode with a separator interposed therebetween is housed in a battery case having an opening sealed by a sealing plate. The first electrode is electrically connected to the sealing plate, and the second electrode is electrically connected to a current collector plate provided between the sealing plate and the electrode group and extending along a longer side direction of the sealing plate. The sealing plate has a lower-strength portion configured to be deformed prior to the other portions of the sealing plate to provide a contact between the sealing plate and the current collector plate when the sealing plate receives an external pressure along the longer side direction of the sealing plate.

5 Claims, 17 Drawing Sheets

(51) Int. Cl.

| | |
|---|---|
| ***H01M 2/10*** | (2006.01) |
| ***H01M 10/02*** | (2006.01) |
| ***H01M 2/12*** | (2006.01) |
| ***H01M 2/34*** | (2006.01) |
| ***H01M 10/04*** | (2006.01) |
| *H01M 2/26* | (2006.01) |

(56) References Cited

U.S. PATENT DOCUMENTS

2006/0099494 A1* 5/2006 Jung et al. ...................... 429/72
2006/0105228 A1* 5/2006 Kim et al. ...................... 429/56
2007/0298314 A1* 12/2007 Partin ...................... H01M 2/34 429/62
2008/0145748 A1* 6/2008 Jung ............................... 429/56
2008/0213658 A1 9/2008 Meguro et al.
2009/0263703 A1* 10/2009 Kim ................................ 429/53
2009/0317665 A1 12/2009 Maeng et al.
2010/0040943 A1 2/2010 Kim
2010/0316894 A1* 12/2010 Hermann ............ H01M 2/1241 429/56
2011/0200849 A1 8/2011 Byun et al.
2012/0301757 A1 11/2012 Yokoyama et al.

* cited by examiner

RECTANGULAR BATTERY

RELATED APPLICATIONS

This application is the U.S. National Phase under 35 U.S.C. §371 of International Application No. PCT/JP2012/002994, filed on May 7, 2012, which in turn claims the benefit of Japanese Application No. 2011-261412, filed on Nov. 30, 2011, and Japanese Application No. 2011-188421, filed on Aug. 31, 2011, the disclosures of which Applications are incorporated by reference herein.

TECHNICAL FIELD

The present disclosure relates to rectangular batteries including a battery case which is substantially rectangular in transverse cross section, and which houses an electrode group and an electrolyte.

BACKGROUND ART

Rectangular batteries using a nonaqueous electrolyte have a configuration in which a battery case made of, e.g., a metal houses an electrode group and an electrolyte. The electrode group is formed by winding a positive electrode and a negative electrode with a separator interposed therebetween. The separator electrically insulates the positive electrode and the negative electrode from each other, and holds the electrolyte. The battery case has an opening at one end, and the opening is sealed by a sealing plate having the substantially same shape as the opening after the electrode group is housed in the battery case.

In many cases, the sealing plate is connected to the battery case, and in that case, the sealing plate and the battery case have the same polarity. In other words, when a positive electrode lead is connected to the sealing plate, the battery case connected to the sealing plate serves as an external terminal of the positive electrode. A through hole is formed in the sealing plate, and a terminal rivet is inserted into the through hole through a gasket. The terminal rivet is connected to a current collector plate disposed under the sealing plate through an insulating plate, and a negative electrode lead is connected to the current collector plate, whereby the terminal rivet serves as an external terminal of the negative electrode. In this way, the terminal of the positive electrode and the terminal of the negative electrode are drawn to the outside the battery.

In such a rectangular battery, the battery case is substantially rectangular in transverse cross section. Therefore, if a predetermined pressure is applied from the outside of the battery, the battery is more likely to be deformed when the pressure is applied along a longer side direction in the transverse cross section of the battery case than when the pressure is applied along a shorter side direction in the transverse cross section of the battery case. Therefore, if a large pressure that deforms the rectangular battery is applied from the outside of the battery, the electrode group is significantly deformed at both ends in the longer side direction thereof to damage a part of the separator. Due to the damage, a positive electrode active material and a negative electrode active material are locally in contact with each other to cause an internal short-circuit. When the internal short-circuit occurs, a large short-circuit current intensively flows between the positive electrode active material and the negative electrode active material which are in contact with each other, and Joule heat is generated. Therefore, the battery may be abnormally overheated.

In order to address such a problem, for example, Document 1 shows a battery in which a cap assembly sealing an opening of the battery case is provided with a terminal plate having a polarity different from that of the battery case. Such a battery, if the battery case is crushed along its longer side direction, allows the battery case and the terminal plate to be in contact with each other in an initial state to immediately discharge the battery, whereby abnormal overheat of the battery can be prevented.

CITATION LIST

Patent Document

PATENT DOCUMENT 1: Japanese Unexamined Patent Publication No. 2010-3690

SUMMARY OF THE INVENTION

Technical Problem

However, in the configuration disclosed in Document 1, the terminal plate having a polarity different from that of the battery case is provided in a position quite close to the battery case, and therefore, even if the battery case is slightly deformed due to, e.g., drop of the battery, an internal short-circuit may occur, posing a problem in terms of reliability.

In view of the problem described above, the present disclosure has been developed. It is an object of the present disclosure to provide a rectangular battery whose safety is ensured with improved reliability by preventing abnormal overheat thereof even if a pressure is applied along a longer side direction of a battery case.

Solution To The Problem

In order to attain the object described above, the present disclosure has a configuration of a rectangular battery in which a sealing plate sealing a battery case has a lower-strength portion having a strength lower than those of any other portions of the sealing plate.

Specifically, a rectangular battery according to the present disclosure in which an electrode group formed by winding a first electrode and a second electrode with a separator interposed therebetween is housed in a battery case having an opening sealed by a sealing plate, wherein the first electrode is electrically connected to the sealing plate, the second electrode is electrically connected to a current collector plate provided between the sealing plate and the electrode group and expending along a longer side direction of the sealing plate, an insulating member is provided between the sealing plate and the current collector plate, and the sealing plate has a lower-strength portion configured to be deformed prior to other portions of the sealing plate to provide a contact between the sealing plate and the current collector plate when the sealing plate receives an external pressure along the longer side direction of the sealing plate.

According to the rectangular battery of the present disclosure, when a pressure deforming the battery case is applied along the longer side direction of the battery case to the battery, the lower-strength portion is compressed toward the longer side direction, and the sealing plate is in contact with the current collector plate having a different polarity to cause an internal short-circuit, whereby the battery can be immediately discharged. The current collector plate and the sealing plate have no active material, and therefore, a portion in which an internal short-circuit has occurred can be prevented from being heated. As described above, since the current collector plate and the sealing plate include no active material, the specific resistances of them are small. Therefore, even if, after the internal short-circuit occurs due to the contact between the current collector plate and the sealing plate, an internal short-circuit occurs due to a contact between the positive electrode active material and the negative electrode active material, current flows into the current collector plate and the sealing plate which have smaller specific resistances. As a result, no large current intensively flows into the battery, and abnormal overheat of the battery can be prevented.

According to the rectangular battery of the present disclosure, it is preferable that a strength of the lower-strength portion varies along a shorter side direction of the sealing plate.

With such a feature, since the sealing plate has the lower-strength portion whose strength is lower than any other portions of the sealing plate and varies along the shorter side direction of the sealing plate, when a pressure deforming the battery case is applied along the longer side direction of the battery case to the battery, the sealing plate is bent around the lower-strength portion, whereby the battery case is bent. Accordingly, even if the current collector plate is not disposed closer to the battery case, the battery case is bent to easily cause an internal short-circuit, whereby the battery can be immediately discharged.

According to the rectangular battery of the present disclosure, it is preferable that the sealing plate has a protruding portion provided closer to an outside than one end of the current collector plate is in a longer side direction of the current collector plate, and protruding toward the electrode group, and the lower-strength portion is provided adjacent to the protruding portion in the longer side direction of the sealing plate.

With such a configuration, when a pressure deforming the battery case is applied along the longer side direction of the battery case to the battery, the lower-strength portion is compressed toward the longer side direction to provide a contact between the protruding portion and the current collector plate having a different polarity to cause an internal short-circuit, whereby the battery can be immediately discharged. In the configuration, the current collector plate is in contact with the protruding portion of the sealing plate, not with the battery case, to cause an internal short-circuit, and therefore, it is possible to dispose the current collector plate and the protruding portion in a position further from the battery case.

Therefore, occurrence of short-circuit failure due to deformation of the battery case by drop, vibration, etc., can be prevented, and reliability of the battery can be improved.

Advantages Of The Invention

The present disclosure can obtain, with a simple configuration, a rectangular battery which can prevent abnormal overheat thereof even if the battery is compressed and deformed by a pressure applied from the outside of the battery, in particular, by an external pressure along a longer side direction of a battery case, and whose safety is ensured with improved reliability.

DESCRIPTION OF EMBODIMENTS

Embodiments of the present disclosure will be described in detail hereinafter with reference to the drawings. The present disclosure is not limited to the following embodiments. Various changes and modifications may be made without departing from the scope of the invention. The following embodiments may be combined with other embodiments.

(First Embodiment)

Figure 1:
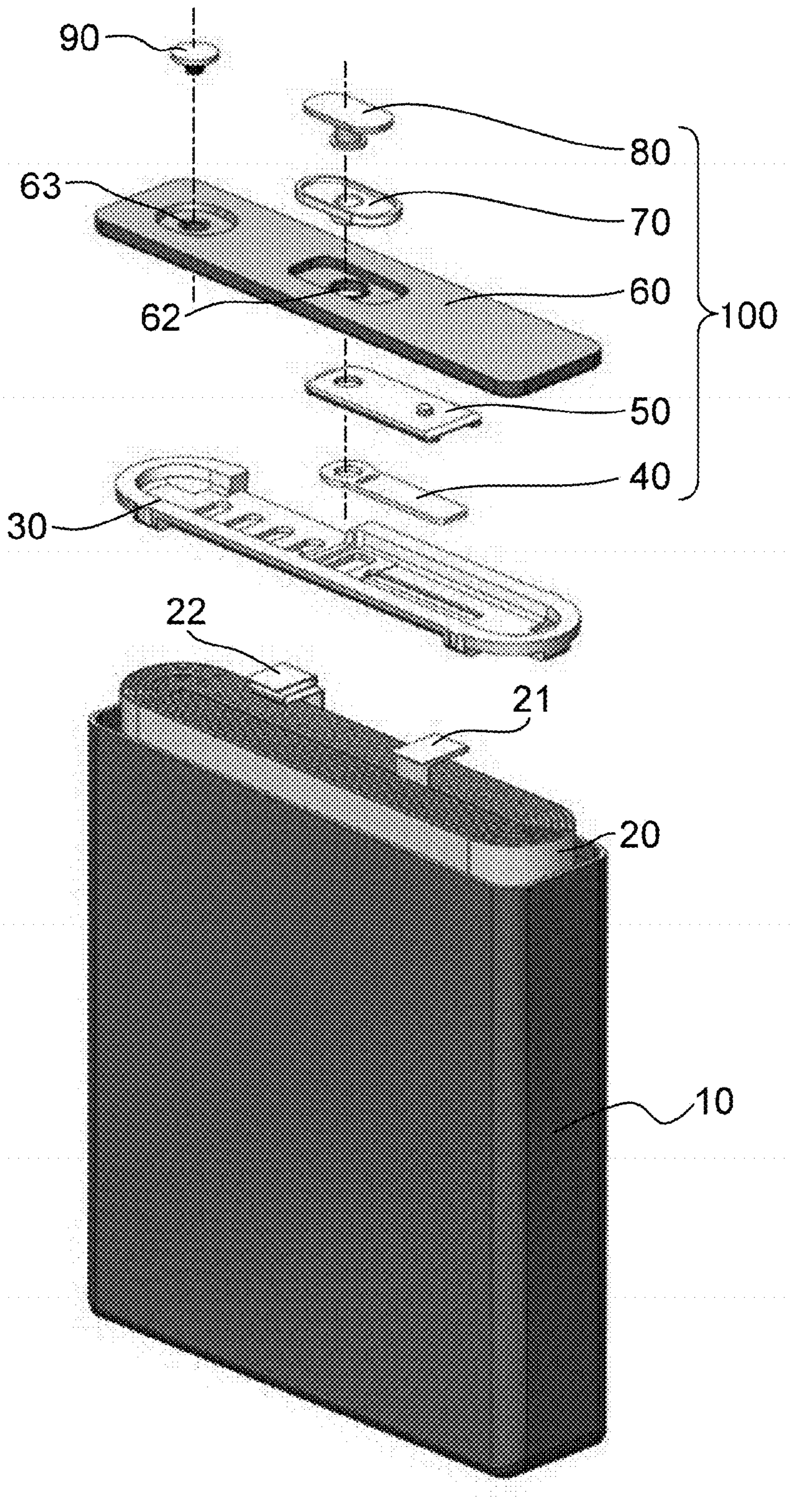
FIG. 1 is a disassembled perspective view illustrating a rectangular battery according to a first embodiment of the present disclosure.

A rectangular battery according to the first embodiment of the present disclosure will be described with reference to FIG. 1. FIG. 1 is a disassembled perspective view illustrating the rectangular battery according to the embodiment.

As shown in FIG. 1, a battery case 10 used for the rectangular battery in the embodiment has one end (the upper end in FIG. 1) that is opened, and the other end (the lower end in FIG. 1) that is closed. The battery case 10 has a substantially rectangular shape in transverse cross section. A longer side direction in the transverse cross section of the battery case 10 is hereinafter referred to as "a longer side direction," and a shorter side direction in the transverse cross section of the battery case 10 is hereinafter referred to as "a shorter side direction." A state where the rectangular battery is crushed by an external pressure along the longer side direction is referred to as "longitudinal crush."

The battery case 10 houses a cylindrical electrode group 20 that is elliptical in transverse cross section and an electrolyte (not illustrated). The electrode group 20 is formed by laminating and winding a positive electrode (a first electrode) and a negative electrode (a second electrode) with a separator that is a porous insulator interposed therebetween. A negative electrode lead 21 is connected to the negative electrode, and a positive electrode lead 22 is connected to the positive electrode. An insulating plate 30 is disposed on the electrode group 20, and the negative electrode lead 21 and the positive electrode lead 22 are drawn from a through hole formed in the insulating plate 30.

An assembled sealing body 100 is provided on the insulating plate 30. The assembled sealing body 100 has a sealing plate 60 having the substantially same shape as that of an opening of the battery case 10. The sealing plate 60 is welded to an opening of the battery case 10 in the periphery of the sealing plate 60, whereby the sealing plate 60 is electrically conducted to the battery case 10 and the battery case 10 is sealed. A terminal through hole 62 is formed in the substantially center of the sealing plate 60, and a rivet terminal 80 is inserted into the terminal through hole 62. The rivet terminal 80 is insulated from the sealing plate 60 by an upper insulating gasket 70 and a lower insulating gasket (insulating member) 50, and is connected to the current collector plate 40 to form the assembled sealing body 100. The current collector plate 40 and the sealing plate 60 are insulated from each other by the lower insulating gasket 50 provided therebetween.

The positive electrode lead 22 is connected to the sealing plate 60, and the battery case 10 conducted to the sealing plate 60 serves as an external terminal of the positive electrode. The negative electrode lead 21 is connected to the current collector plate 40, and the rivet terminal 80 conducted to the current collector plate 40 serves as an external terminal of the negative electrode.

A liquid inlet 63 is formed at one end in the longer side direction of the sealing plate 60. The liquid inlet 63 is a through hole for supplying the electrolyte to the battery case 10, and is sealed by a plug 90.

The sealing plate 60 has a thin portion 68, which is not seen in FIG. 1 because it is located in the shadow of the figure, serving as a lower-strength portion having a strength lower than those of any other portions of the sealing plate 60 in the inner surface thereof (the lower surface in FIG. 1) at the other end in the longer side direction of the sealing plate 60. The thin portion 68, which will be described in detail later, is configured to be deformed prior to the other portions of the sealing plate 60 upon receiving an external pressure along the longer side direction of the sealing plate 60 to allow the sealing plate 60 and the current collector plate 40 to be in contact with each other.

With such a configuration, when longitudinal crush occurs, the thin portion 68 is deformed, whereby the sealing plate 60 is in contact with the current collector plate 40 having a different polarity to cause an internal short-circuit. Therefore, even if the electrode group 20 is deformed after the internal short-circuit and the positive electrode active material and the negative electrode active material are locally in contact with each other, short-circuit current is not concentrated and abnormal overheat of the battery can be prevented. According to the configuration of the embodiment, the simple configuration of forming only the thin portion 68 in the sealing plate 60 without adding an extra space and element can provide a rectangular battery with high safety.

Figure 2A:
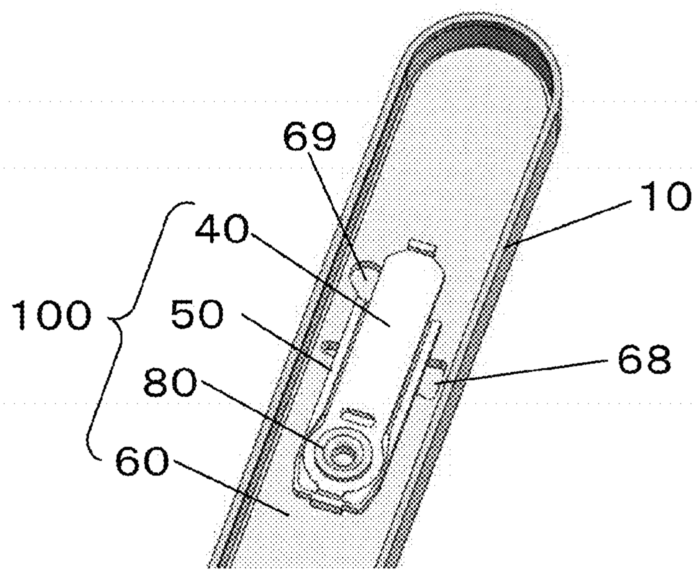
FIG. 2A is a partial perspective view illustrating a top transverse cross-section of the rectangular battery according to the first embodiment of the present disclosure.

Next, the sealing plate of the rectangular battery according to the embodiment will be described in detail with reference to FIG. 2. FIG. 2A is a partial perspective view illustrating a top transverse cross-section of the rectangular battery according to the first embodiment of the present disclosure, and FIG. 2B is a partial perspective view illustrating only a battery case and a sealing plate of FIG. 2A.

Figure 2B:
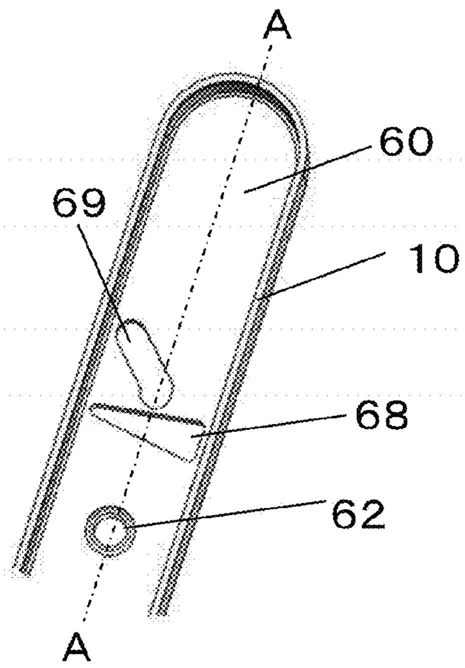
FIG. 2B is a partial perspective view illustrating only a battery case and a sealing plate of FIG. 2A.

As illustrated in FIG. 2A and 2B, the current collector plate 40 electrically connected to the negative electrode lead 21 is provided on the inner surface side of the sealing plate 60 of the rectangular battery according to the embodiment. The current collector plate 40 is caulked by the rivet terminal 80 inserted into the terminal through hole 62 of the sealing plate 60 to be connected to the sealing plate 60. The lower insulating gasket 50 that serves as an insulating member is provided between the current collector plate 40 and the sealing plate 60, thereby insulating the current collector plate 40 and the sealing plate 60 insulating member from each other.

The inner surface of the sealing plate 60 includes the thin portion 68 having a relatively thin thickness and serving as a lower-strength portion to bend the sealing plate 60 toward a direction that deviates from the center line extending along the longer side direction of the sealing plate 60 by an external pressure along the longer side direction of the sealing plate 60.

The entire region of the thin portion 68 is formed by, e.g., press work to have a thickness thinner than those of any other portions of the sealing plate 60. Therefore, the thin portion 68 having a strength lower than those of any other portions of the sealing plate 60, and is compressed by longitudinal crush prior to the other portions.

The thin portion 68 is formed such that the sealing plate 60 is bent due to compression by longitudinal crush. Therefore, the thin portion 68 has a shape and a disposition to be able to bend the sealing plate 60. Specifically, the thin portion 68 has a strength varying along the shorter side direction of the sealing plate 60. Such a thin portion 68 is provided to allow the sealing plate 60 to be bent.

In FIG. 2B, the thin portion 68 is formed such that the strength thereof decreases from one end toward the other end in the shorter side direction of the sealing plate 60. Specifically, the thin portion 68 is formed such that an area of the right side thereof relative to the center line A-A is larger. Therefore, since the right side of the sealing plate 60 is compressed more widely, the sealing plate 60 is bent toward the right side thereof.

It is preferable that the sealing plate 60 includes a guide notch portion 69 serving as a guiding portion at a position closer to an end in the longer side direction of the sealing plate 60 than the thin portion 68 is. The guide notch portion 69 is a groove formed at the inner surface side of the sealing plate 60 to be recessed toward a direction away from the current collector plate 40, and is fit in a protrusion provided in the lower insulating gasket 50 and protruding toward the groove, thereby fixing the lower insulating gasket 50. Furthermore, a groove is provided at the inner surface side of the lower insulating gasket 50, and the current collector plate 40 is fit in the groove. The lower insulating gasket 50 is fixed as described above, whereby the current collector plate 40 is also fixed in a similar manner.

The guide notch portion 69 extends from the center line A-A extending along the longer side direction of the sealing plate 60 toward one end in the shorter side direction of the sealing plate 60. The one end in the shorter side direction is the end of the thin portion 68 at which the strength thereof is higher. In this case, the guide notch portion 69 is preferably formed to be inclined relative to the shorter side direction of the sealing plate 60. With such a configuration, when the sealing plate 60 is bent, since the protrusion of the lower insulating gasket 50 fit in the guide notch portion 69 moves along the guide notch portion 69, the battery case 10 can smoothly move so as to be close to the current collector plate 40. As a result, an end of the current collector plate 40 can be reliably in contact with a side surface of the battery case 10.

Figure 3A:
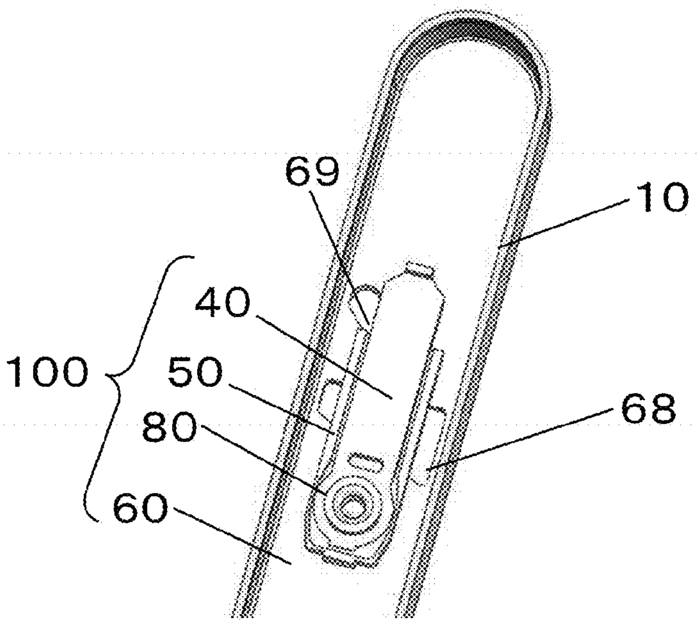
FIG. 3A is a partial perspective view illustrating a top transverse cross-section of a rectangular battery according to a first variation of the first embodiment of the present disclosure.
Figure 3B:
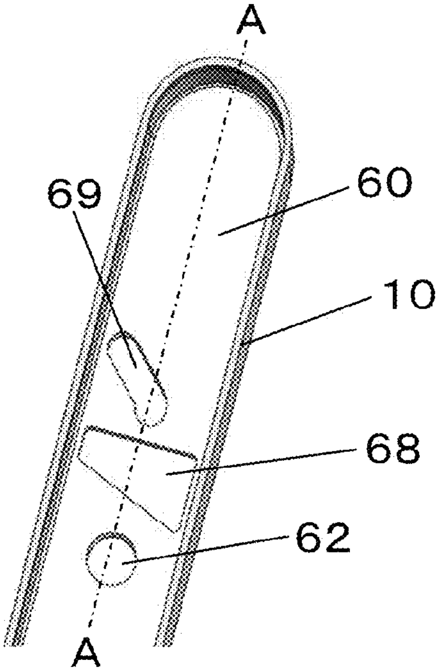
FIG. 3B is a partial perspective view illustrating only a battery case and a sealing plate of FIG. 3A.

In the embodiment, the thin portion 68 is formed in a triangular shape, as illustrated in FIGS. 2A and 2B. It is not limited to that shape as long as it can bend the sealing plate 60. For example, the thin portion 68 may be formed such that the length in the longer side direction varies from one end toward the other end in the shorter side direction of the sealing plate 60. Specifically, as a first variation of the embodiment, the thin portion 68 may be formed in a trapezoidal shape as illustrated in FIGS. 3A and 3B. In FIG. 3B, the thin portion 68 formed to have a thin thickness is formed such that an area of the right side thereof relative to the center line A-A is larger. Therefore, since the right side of the sealing plate 60 is compressed more widely, the sealing plate 60 is bent toward the right side thereof.

Figure 4A:
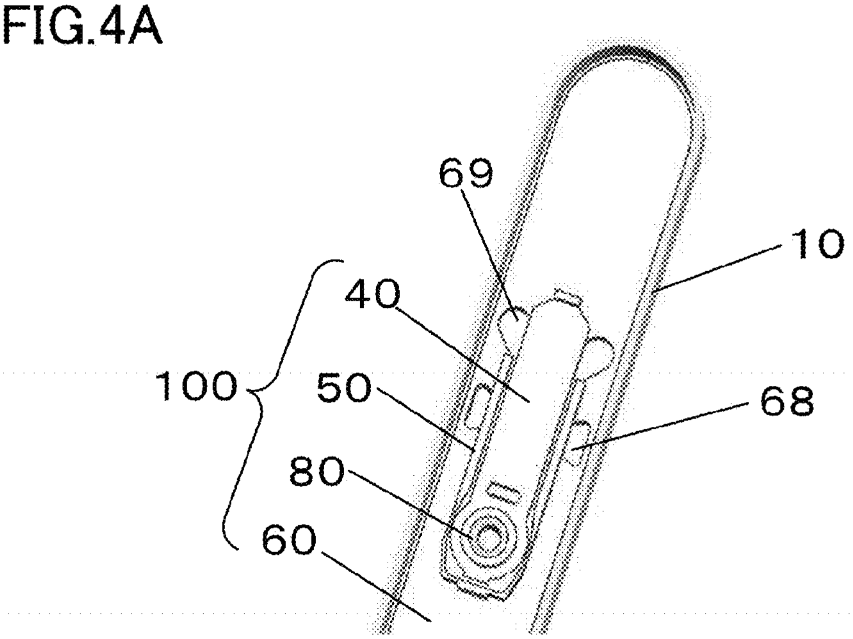
FIG. 4A is a partial perspective view illustrating a top transverse cross-section of a rectangular battery according to a second variation of the first embodiment of the present disclosure.
Figure 4B:
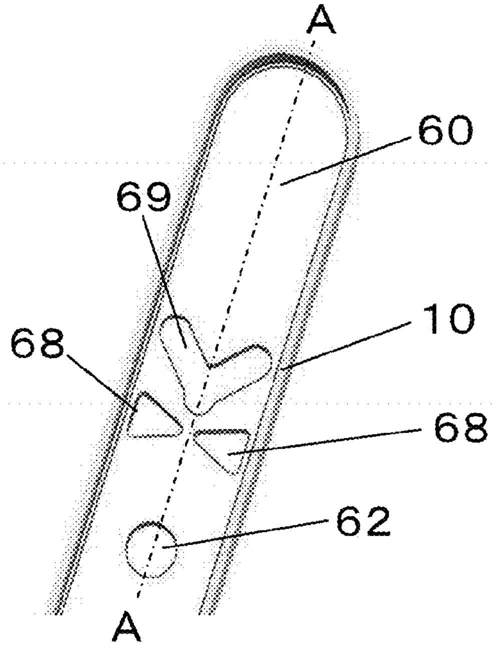
FIG. 4B is a partial perspective view illustrating only a battery case and a sealing plate of FIG. 4A.

Other than the above variation, as illustrated in FIGS. 4A and 4B, a configuration, as a second variation of the embodiment, in which the thin portion 68 is formed such that the area of the thin portion 68 increases from the center line A-A extending along the longer side direction of the sealing plate 60 toward one end in the shorter side direction of the sealing plate 60 can also bend the sealing plate 60. For example, if two thin portions 68 made thinner than any other portions of the sealing plate 60 are formed to have a shape as illustrated in FIG. 4A and 4B, the sealing plate 60 can be bent in either direction, right or left. In FIG. 4A and 4B, each of the two thin portions 68 is formed in the right or the left of the center line A-A. They may be coupled together on the center line.

Figure 5A:
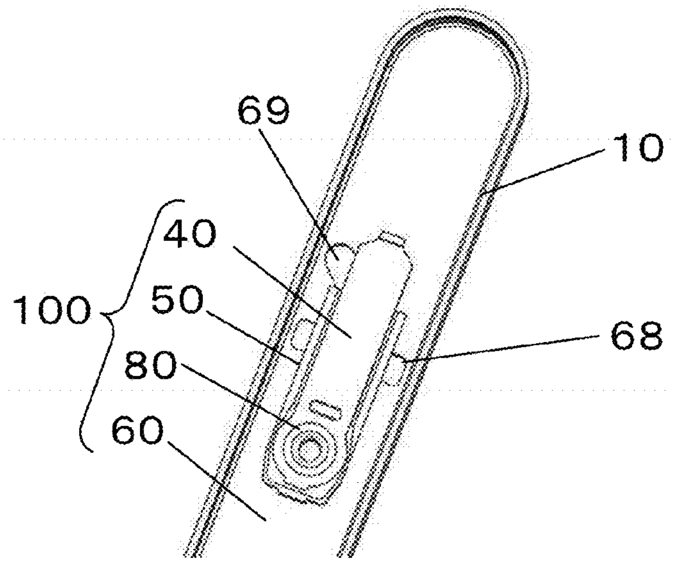
FIG. 5A is a partial perspective view illustrating a top transverse cross-section of a rectangular battery according to a third variation of the first embodiment of the present disclosure.
Figure 5B:
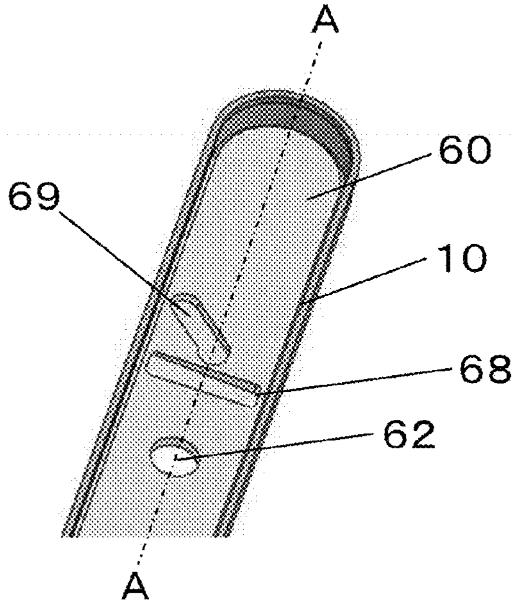
FIG. 5B is a partial perspective view illustrating only a battery case and a sealing plate of FIG. 5A.

The area of the thin portion 68 varies along the right or left side of the center line A-A extending along the longer side direction of the sealing plate 60, thereby making it possible to bend the sealing plate 60. The thickness, not the area, may vary to make it possible to bend the sealing plate 60. For example, as a third variation of the embodiment, the right part and the left part of the thin portion 68 relative to the line A-A may have the same area, and the thickness of the right part may be differentiated from that of the left part. In such a manner, the sealing plate 60 can be bent due to compression of the thin portion 68 by longitudinal crush. Specifically, as illustrated in FIGS. 5A and 5B, when the left part of the thin portion 68 is made thinner than the right part thereof relative to the line A-A, the right part relative to the line A-A is compressed earlier, and therefore, the sealing plate 60 can be easily bent.

Figure 6:
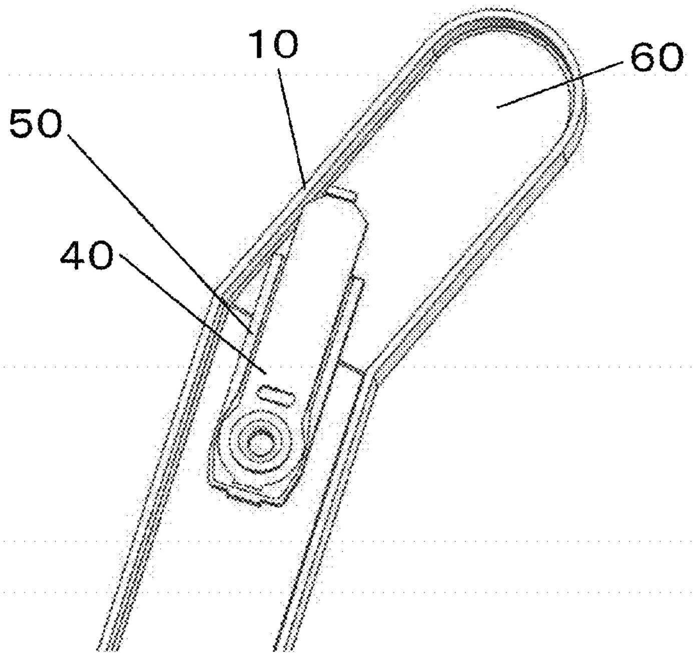
FIG. 6 is a partial perspective view of a top transverse cross-section of the rectangular battery according to the first embodiment of the present disclosure illustrating a crush state of the battery when the rectangular battery receives a pressure along a longitudinal direction thereof.

Next, a mechanism where an internal short-circuit occurs when the rectangular battery of the embodiment is bent will be described with reference to FIG. 6.

As described above, when the rectangular battery of the embodiment is longitudinally crushed, the thin portion 68 having a relatively low strength is compressed earlier, whereby the sealing plate 60 is bent. Specifically, when the sealing plate 60 including the thin portion 68 illustrated in, e.g., FIG. 2 is used, the thin portion 68 is compressed due to longitudinal crush, and along the compression, the sealing plate 60 is bent toward the right side as shown in FIG. 6. The battery case 10 connected to the sealing plate 60 is also bent together with the sealing plate 60, and a part of a side surface of the battery case 10 moves toward the current collector plate 40. The bending of the battery case 10 allows an end of the current collector plate 40 to be in contact with the side surface of the battery case 10 having a different polarity, whereby the battery can be immediately discharged.

The thin portion 68 described above is preferably disposed to face the current collector plate 40, thus, to overlap the current collector plate 40. The thin portion 68 is preferably formed such that the shortest distance between the thin portion 68 and the end of the current collector plate 40 is longer than the shortest distance between the side surface of the battery case 10 and the side surface of the current collector plate 40. With such a relationship, even if the sealing plate 60 is not significantly bent, an internal short-circuit can occur, and therefore, the safety of the battery can be ensured.

Figure 7:
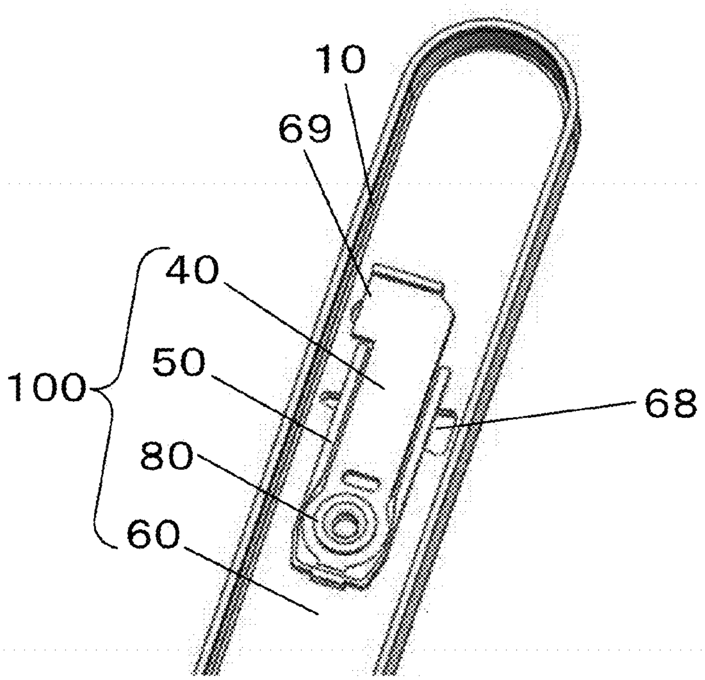
FIG. 7 is a partial perspective view illustrating a top transverse cross-section of a rectangular battery according to a fourth variation of the first embodiment of the present disclosure.

Next, a rectangular battery according to a fourth variation of the first embodiment of the present disclosure will be described with reference to FIG. 7. FIG. 7 is a partial perspective view illustrating a top transverse cross-section of the rectangular battery according to the fourth variation of the first embodiment of the present disclosure. This variation is different from the first embodiment in the shape of the current collector plate.

The current collector plate of the rectangular battery according to the first embodiment is linear, but is not limited to this shape. For example, as the current collector plate 40 of the rectangular battery according to the variation illustrated in FIG. 7, the current collector plate 40 may have an end extending toward a side surface in the longer side of the battery case 10. With such a shape, if longitudinal crush occurs, the extending end of the current collector plate 40 is earlier in contact with the side surface of the battery case 10 to cause an internal short-circuit, and therefore, the safety of the battery can be improved.

Figure 8A:
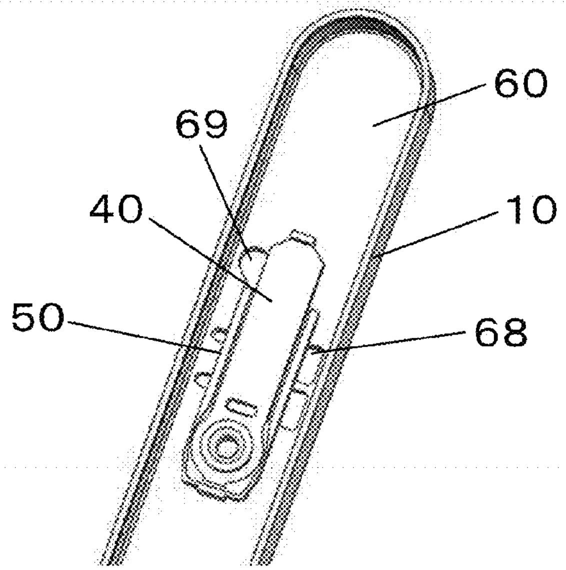
FIG. 8A is a partial perspective view illustrating a top transverse cross-section of a rectangular battery according to a fifth variation of the first embodiment of the present disclosure.
Figure 8B:
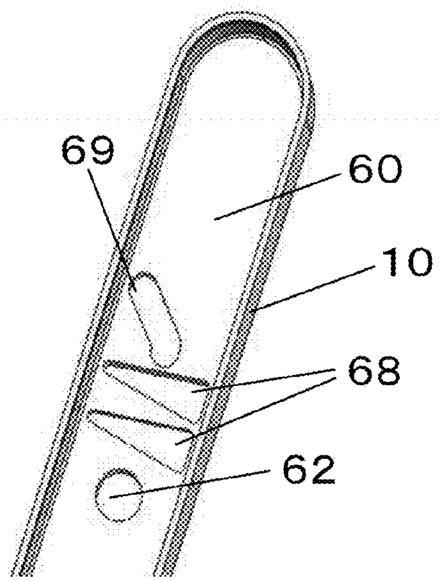
FIG. 8B is a partial perspective view illustrating only a battery case and a sealing plate of FIG. 8A.

The number of the thin portion 68 is not limited, and as illustrated in FIGS. 8A and 8B, the thin portion 68 may include a plurality of the thin portions 68 (two in the figures) as a fifth variation of the embodiment. With such a configuration, the total area of the thin portions 68 can increase while the strength of the sealing plate 60 is prevented from decreasing. Therefore, if longitudinal crush occurs, the end of the current collector plate 40 is earlier in contact with the side surface of the battery case 10 to cause an internal short-circuit.

The method for forming the thin portion 68 in the first embodiment and the variations thereof is not limited to the methods described above. For example, the other portions of the sealing plate 60 may be reinforced such that the strength of the thin portion 68 is relatively low. Specifically, the sealing plate can also be bent by using the sealing plate made of aluminum, and welding a nickel plate to regions of the sealing plate each extending from one end or the other end in the longer side direction of the sealing plate to the thin portion 68 in either of the right side or the left side of the center line extending along the longer side direction of the sealing plate.

In the first embodiment and the variations thereof, the thin portion 68 is provided in the sealing plate 60, thereby making it possible to bend the sealing plate. Only the guide notch portion 69 may be provided without the thin portion 68. In such a configuration, if longitudinal crush occurs, the end of the current collector plate 40 is earlier in contact with the side surface of the battery case 10, whereby an internal short-circuit can be caused.

(Second Embodiment)

Next, a rectangular battery according to a second embodiment of the present disclosure will be described. In the second example embodiment, the same members as those of the first embodiment and the variations thereof are denoted by the same reference characters, and description thereof will be omitted. Only those parts different from the first embodiment will be described below. The rectangular battery according to the second embodiment is different from that of the first embodiment in the configuration of the sealing plate.

Figure 9:
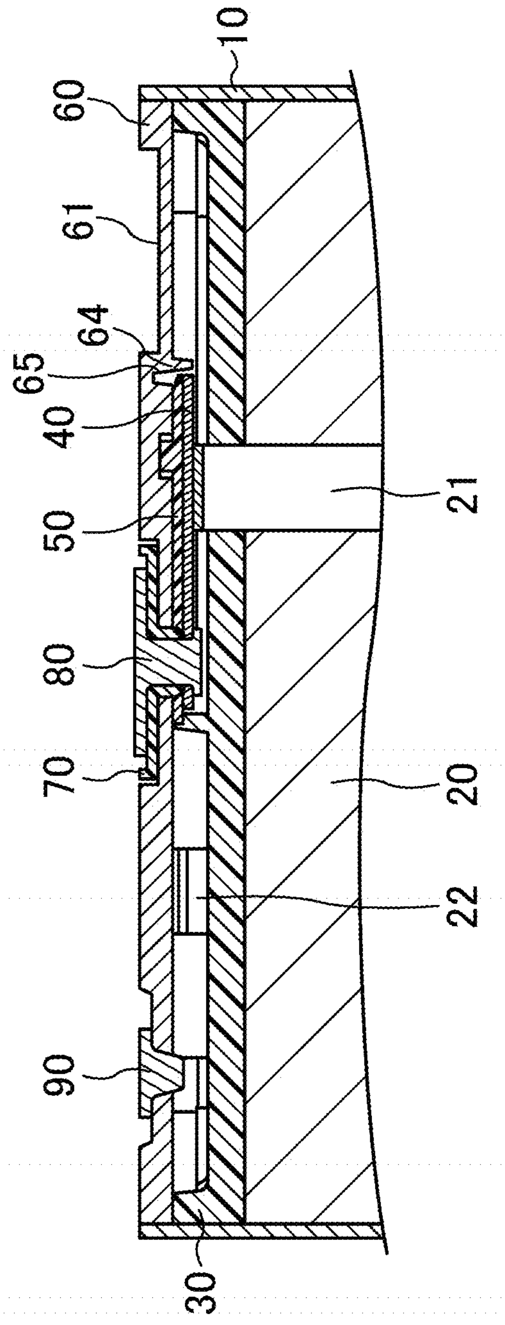
FIG. 9 is a partial cross-sectional view illustrating an upper part of a rectangular battery according to a second embodiment of the present disclosure.
Figure 10:
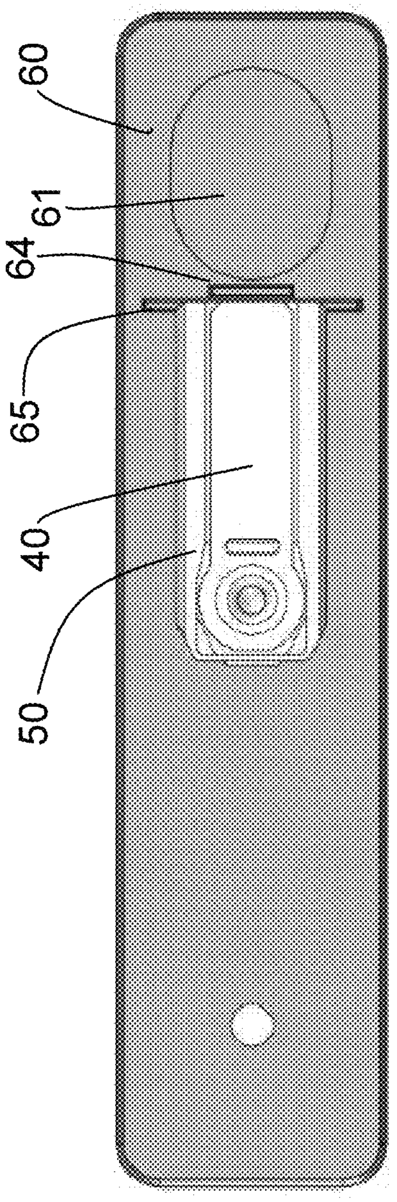
FIG. 10 is a view illustrating an inner surface side of a sealing plate of the rectangular battery according to the second embodiment of the present disclosure.
Figure 11:
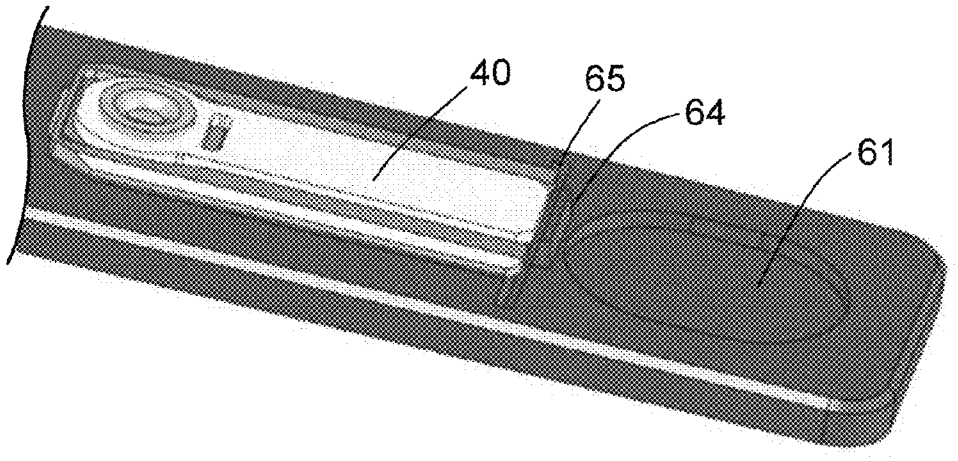
FIG. 11 is an enlarged partial perspective view illustrating the inner surface side of the sealing plate of the rectangular battery according to the second embodiment of the present disclosure.
Figure 12:
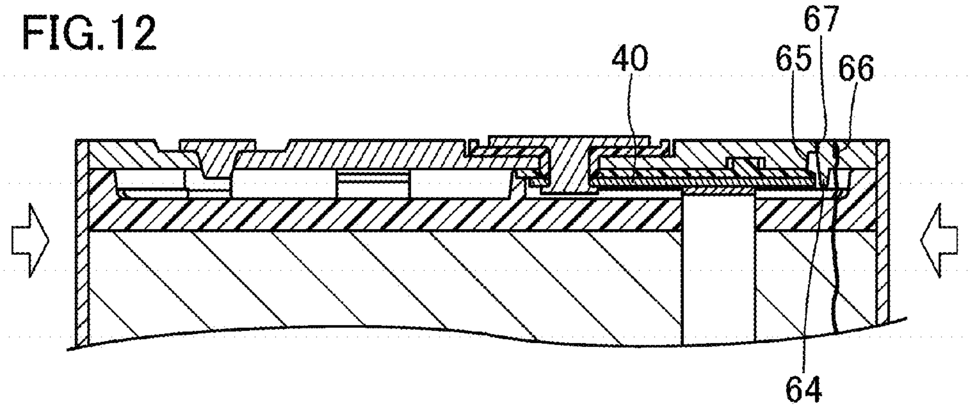
FIG. 12 is a cross-sectional view illustrating a crush state of the upper part of the rectangular battery according to the second embodiment of the present disclosure when the rectangular battery receives a pressure along the longitudinal direction thereof.

The rectangular battery according to the second embodiment, in particular, the sealing plate will be described with reference to FIGS. 9-13. FIG. 9 is a partial cross-sectional view illustrating an upper part of the rectangular battery according to the embodiment, FIG. 10 is a view illustrating an inner surface side of the sealing plate of the rectangular battery according to the embodiment, and FIG. 11 is an enlarged partial perspective view illustrating the inner surface side of the sealing plate of the rectangular battery according to the embodiment. FIG. 12 is a cross-sectional view illustrating a crush state of the upper part of the rectangular battery according to the embodiment when the rectangular battery receives a pressure along the longitudinal direction thereof, and FIG. 13 is a view illustrating a crush state of the inner surface side of the sealing plate of the rectangular battery according to the second embodiment when the rectangular battery receives a pressure along the longitudinal direction thereof.

As illustrated in FIGS. 9-11, a current collector plate 40 electrically connected to a negative electrode lead 21 is provided under (inner surface side) a sealing plate 60 electrically connected to a positive electrode lead 22 and above an electrode group 20 so as to extend along the longer side direction of the sealing plate 60. A lower insulating gasket 50 serving as an insulating member is provided between the sealing plate 60 and the current collector plate 40, and the gasket insulates the current collector plate 40 and the sealing plate 60 from each other. A protruding portion 64 protruding toward the electrode group 20 is formed in the inner surface side of the sealing plate 60, and the protruding portion 64 is disposed closer to the outside in the longer side direction of the sealing plate 60, thus, closer to one end in the longer side direction of the sealing plate 60, than one end of the current collector plate 40 (the right side in FIG. 10) is. A thin portion 61 having a relatively thin thickness and serving as a lower-strength portion is provided at the end in the longer side direction of the sealing plate 60, and the protruding portion 64 is provided so as to be located between the current collector plate 40 and the thin portion 61 in the longer side direction of the sealing plate 60. In other words, the thin portion 61 is located further from the current collector plate 40 than the protruding portion 64 is, and is provided in a position adjacent to the protruding portion 64 in the longer side direction of the sealing plate 60. "Adjacent" means not only being in contact with something, but also being close to something.

Figure 13:
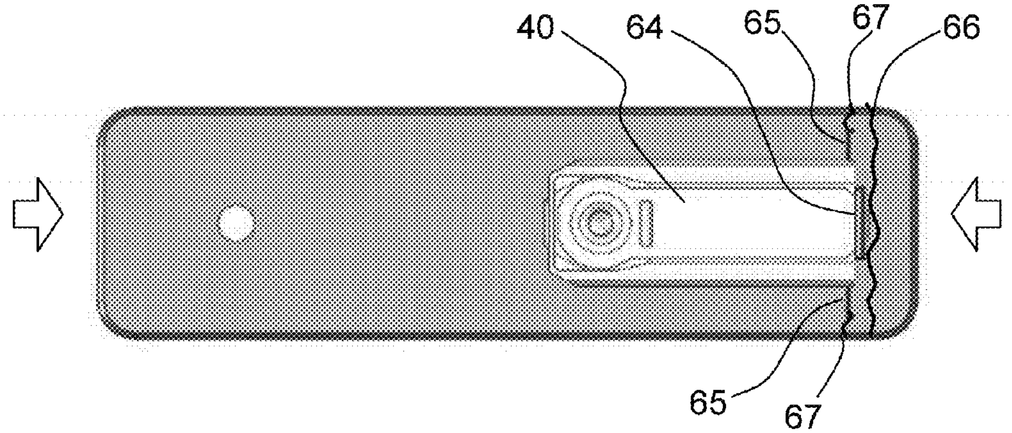
FIG. 13 is a view illustrating a crush state of the inner surface side of the sealing plate of the rectangular battery according to the second embodiment of the present disclosure when the rectangular battery receives a pressure along the longitudinal direction thereof.

According to the rectangular battery of the second embodiment, as illustrated in FIGS. 12 and 13, when a pressure is applied from the outside of the battery toward the arrow direction and the rectangular battery is longitudinally crushed, a portion located closer to the outside in the longer side direction than the thin portion 61 having a relatively thin thickness and serving as a lower-strength portion is compressed to move to the protruding portion 64, thereby forming a compression-deformed thin portion 66. At that time, the protruding portion 64 is pressed toward the current collector plate 40 by the compression-deformed thin portion 66, and is in contact with the current collector plate 40, thereby causing an internal short-circuit. Therefore, according to the embodiment, at the time of longitudinal crush, the current collector plate 40 and the sealing plate 60 are easily in contact with each other to cause an internal short-circuit, thereby making it possible to immediately discharge the battery. Therefore, the concentration of a short-circuit current due to a local internal short-circuit between a positive electrode active material and a negative electrode active material of the electrode group 20 can be reduced, and abnormal overheat of the battery can be prevented to provide a safer rectangular battery.

The protruding portion 64 preferably protrudes to at least the position of the current collector plate 40 in order to be reliably in contact with the current collector plate 40 at the time of longitudinal crush.

In the embodiment, in the sealing plate 60, a notch portion 65 serving another lower-strength portion is formed in a position closer to the inside in the longer side direction of the sealing plate 60 than the protruding portion 64 is, thus, in a position located closer to the current collector plate 40 than the protruding portion 64 is. As illustrated in FIG. 10, for example, the notch portion 65 is formed in the inner surface of the sealing plate 60 and extends along the shorter side direction of the sealing plate 60 so as to be easily compressed when the battery is longitudinally crushed. As illustrated in FIGS. 12 and 13, the notch portion 65 is compressed at the time of longitudinal crush, thereby forming a compression-deformed notch portion 67. This allows the protruding portion 64 to be closer to the current collector plate 40, and the protruding portion 64 is more likely to be in contact with the current collector plate 40 to make it possible to more reliably cause an internal short-circuit.

In the embodiment, the sealing plate 60 in which the thin portion 61 and the notch portion 65 are formed has been described. A sealing plate 60 in which the thin portion 61 is not formed and only the notch portion 65 is formed may be utilized. When such a sealing plate 60 is used, the notch portion 65 is compressed due to longitudinal crush, thereby allowing the protruding portion 64 and the current collector plate 40 to be in contact with each other to cause an internal short-circuit. A sealing plate in which the notch portion 65 is not formed and only the thin portion 61 is formed may be utilized, too. When such a sealing plate 60 is used, the thin portion 61 is compressed to allow the protruding portion 64 and the current collector plate 40 to be in contact with each other to cause an internal short-circuit.

In this embodiment, the thin portion 61 may also serve as, e.g., an explosion-proof valve. Because of the explosion-proof valve, if gas is generated inside the battery and the inner pressure of the battery exceeds a predetermined value, the explosion-proof valve is broken, whereby the inner pressure of the rectangular battery can be prevented from being further increased and the battery can be prevented from being broken.

In the embodiment, the protruding portion 64 of the sealing plate 60 coming in contact with the current collector plate 40 at the time of longitudinal crush to cause an internal short-circuit is formed in a position further from a side wall of the battery case 10 in the short side thereof. Therefore, even if the battery case 10 is slightly deformed by the application of a pressure along the longer side direction due to impact such as drop and vibration, an internal short-circuit due to a contact between the battery case 10 and the current collector plate 40 is less likely to occur, and a battery with high reliability can be provided.

In the longer side direction of the sealing plate 60, if the end of the lower insulating gasket 50 facing the protruding portion 64 is allowed to protrude toward the protruding portion 64 to be closer to the protruding portion 64 than the end of the current collector plate 40 is, and even if the protruding portion 64 and the current collector plate 40 are closely disposed, a failure due to the contact between the current collector plate 40 and the protruding portion 64 is less likely to occur and the reliability of the battery can be ensured. Therefore, it is possible to closely dispose the protruding portion 64 and the current collector plate 40, and an internal short-circuit occurs when the battery is longitudinally crushed.

The distance between the current collector plate 40 and the protruding portion 64 is preferably 0.3 nm or more in terms of preventing a contact between the current collector plate 40 and the protruding portion 64 due to impact such as drop and vibration. If the current collector plate 40 and the protruding portion 64 to cause an internal short-circuit are formed in the substantially central portion of the battery case 10 in the longer side direction thereof, before the above internal short-circuit occurs, a local internal short-circuit between the positive electrode active material and the negative electrode active material due to deformation of the electrode group 20 leads to an increase in the possibility that abnormal overheat of the battery occurs. Specifically, if longitudinal compression occurs to shorten the length of the longer side of the battery case 10 to about one fourth of that, abnormal overheat of the battery is likely to occur. Therefore, in the longer side direction of the battery case 10, the distance between a side wall of the shorter side of the battery case 10 and the protruding portion 64 is preferably less than one fourth of the length of the longer side of the battery case 10.

Figure 14:
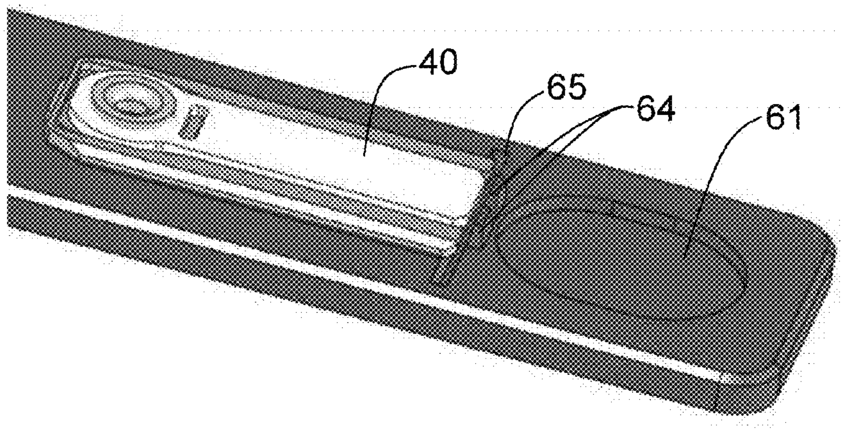
FIG. 14 is an enlarged partial perspective view illustrating an inner surface side of a sealing plate of a rectangular battery according to a first variation of the second embodiment of the present disclosure.

In the embodiment, the shape and the number of the protruding portion 64 and the notch portion 65 are not limited to the above configuration. As illustrated in FIG. 14, the protruding portion 64 may include a plurality of the protruding portions 64 (two in FIG. 14), as a first variation of the second embodiment of the present disclosure. The protruding portion 64 can be formed by, e.g., press work. When performing the press work, the smaller the shape of the protruding portion 64 is, the more easily the press work is performed. Therefore, forming a plurality of small protruding portions 64 can improve productivity.

Figure 15:
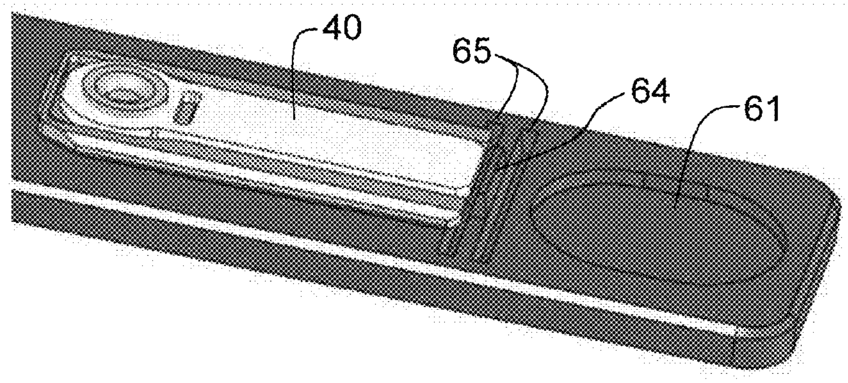
FIG. 15 is an enlarged partial perspective view illustrating an inner surface side of a sealing plate of a rectangular battery according to a second variation of the second embodiment of the present disclosure.

As illustrated in FIG. 15, the notch portion 65 may include a plurality of the notch portions 65 (two in FIG. 15), as a second variation of the second embodiment of the present disclosure. In this case, the notch portions 65 may be formed so as to sandwich, e.g., the protruding portion 64.

Figure 16:
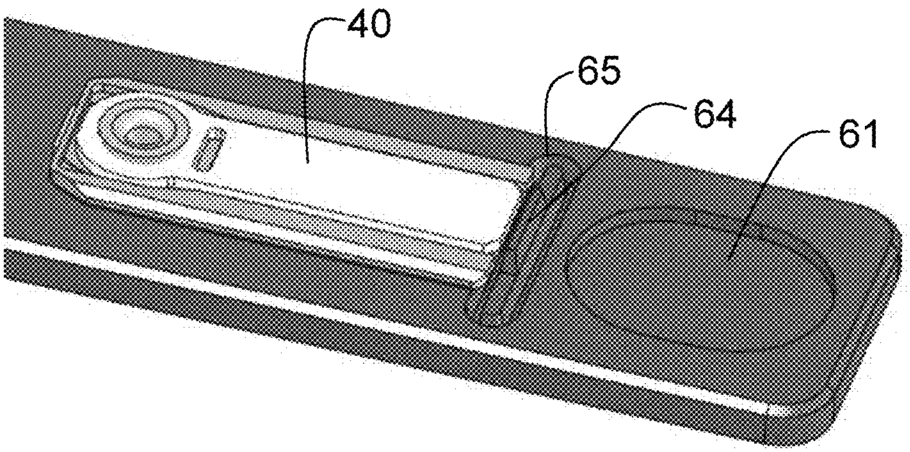
FIG. 16 is an enlarged partial perspective view illustrating an inner surface side of a sealing plate of a rectangular battery according to a third variation of the second embodiment of the present disclosure.

As illustrated in FIG. 16, the notch portion 65 may have a shape surrounding the protruding portion 64, as a third variation of the second embodiment of the present disclosure.

Figure 17:
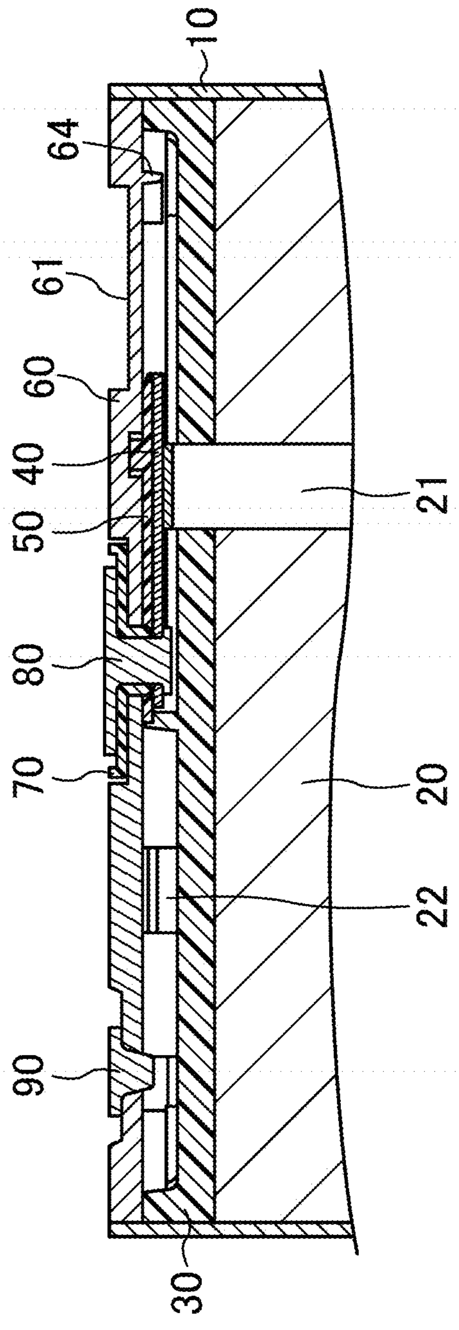
FIG. 17 is a partial cross-sectional view illustrating an upper part of a rectangular battery according to a fourth variation of the second embodiment of the present disclosure.
Figure 18:
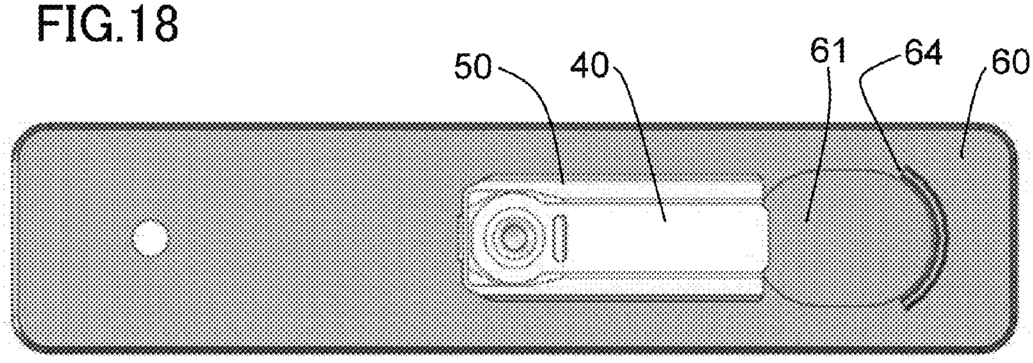
FIG. 18 is a view illustrating an inner surface side of a sealing plate of the rectangular battery according to the fourth variation of the second embodiment of the present disclosure.
Figure 19:
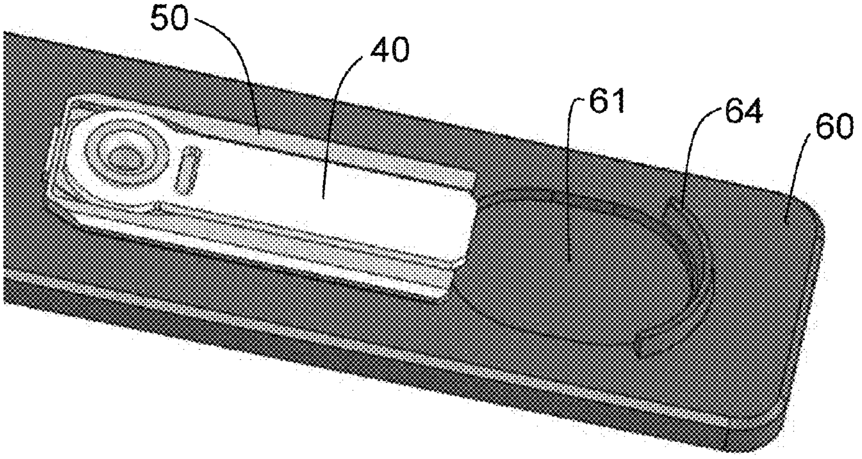
FIG. 19 is an enlarged partial perspective view illustrating the inner surface side of the sealing plate of the rectangular battery according to the fourth variation of the second embodiment of the present disclosure.
Figure 20:
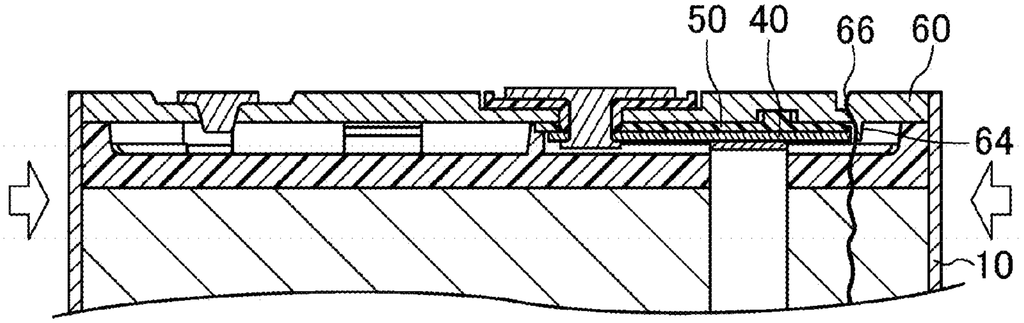
FIG. 20 is a partial cross-sectional view illustrating a crush state of the upper part of the rectangular battery according to the fourth variation of the second embodiment of the present disclosure when the rectangular battery receives a pressure along the longitudinal direction thereof.

Next, a rectangular battery according to a fourth variation of the second embodiment of the present disclosure will be described with reference to FIGS. 17-21. FIG. 17 is a cross-sectional view illustrating an upper part of the rectangular battery according to the fourth variation, FIG. 18 is a view illustrating the inner surface side of a sealing plate of the rectangular battery according to the fourth variation, and FIG. 19 is an enlarged partial perspective view illustrating the inner surface side of the sealing plate of the rectangular battery according to the fourth variation. FIG. 20 is a partial cross-sectional view illustrating a crush state of the upper part of the rectangular battery according to the fourth variation when the rectangular battery receives a pressure along the longitudinal direction thereof, and FIG. 21 is a view illustrating a crush state of the inner surface side of the sealing plate of the rectangular battery according to the fourth variation when the rectangular battery receives a pressure along the longitudinal direction thereof.

As illustrated in FIGS. 17-19, unlike the second embodiment, the variation has a configuration in which the protruding portion 64 is formed in the inner surface side of the sealing plate 60 so as to be located closer to the outside in the longitudinal direction than the thin portion 61 is. In other words, the thin portion 61 is provided closer to the current collector plate 40 than the protruding portion 64 is, thus, adjacent to the protruding portion 64 in the longer side direction of the sealing plate 60.

In a small rectangular battery, the sealing plate 60 is small, and unlike the second embodiment, it is difficult to provide the protruding portion 64 between the current collector plate 40 and the thin portion 61. In this variation, the protruding portion 64 is provided at a position closer to one end in the longer side direction of the sealing plate 60 (the right side in FIG. 18), and therefore, even a small rectangular battery can be easily fabricated.

Figure 21:
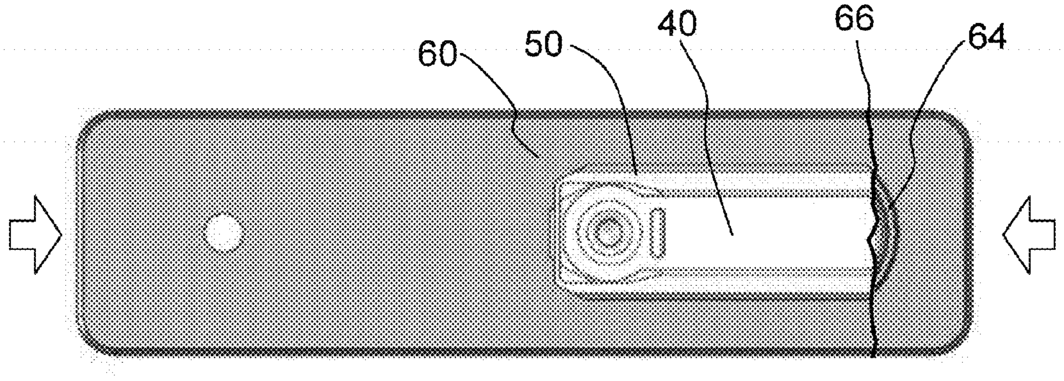
FIG. 21 is a view illustrating a crush state of the inner surface side of the sealing plate of the rectangular battery according to the fourth variation of the second embodiment of the present disclosure when the rectangular battery receives a pressure along the longitudinal direction thereof.

According to the variation, as illustrated in FIGS. 20 and 21, when a pressure is applied from the outside of the battery along the arrow direction and the battery case 10 is longitudinally crushed, the thin portion 61 which has a thin thickness and whose strength is lower is earlier compressed, thereby forming the compression-deformed thin portion 66. This allows the protruding portion 64 located closer to the outside in the longer side direction of the sealing plate 60 than the thin portion 61 is to move toward the current collector plate 40 having a different polarity to be in contact with the current collector plate 40, thereby causing an internal short-circuit. Therefore, in the configuration of this variation, the current collector plate 40 can be also easily in contact with the protruding portion 64 of the sealing plate 60 due to longitudinal crush to cause an internal short-circuit, and it is possible to reduce concentration of short-circuit current due to a local short-circuit between the positive electrode active material and the negative electrode active material of the electrode group 20 and to prevent abnormal overheat of the battery. This makes it possible to provide a safer rectangular battery.

Figure 22:
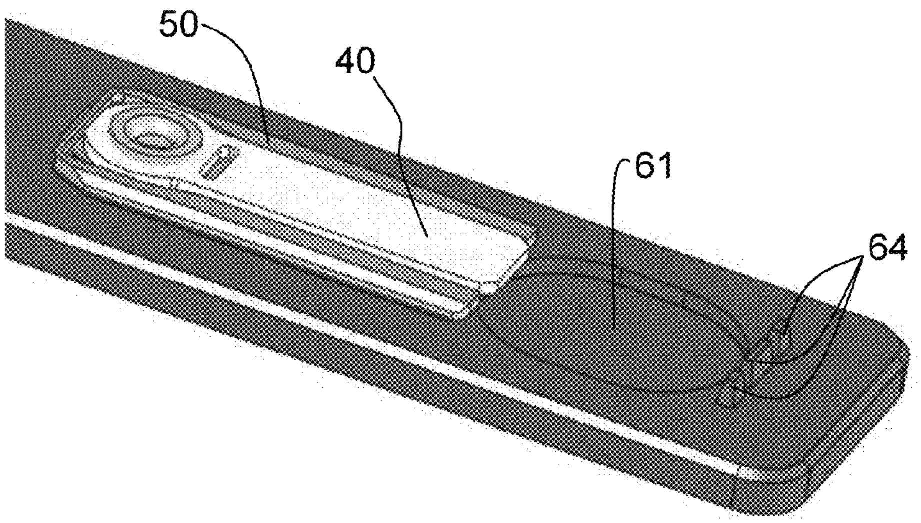
FIG. 22 is an enlarged partial perspective view illustrating the inner surface side of a sealing plate of a rectangular battery according to a fifth variation of the second embodiment of the present disclosure.

In this variation, the shape and the number of the protruding portion 64 and the notch portion 65 are not limited to the above configuration. As illustrated in FIG. 22, the protruding portion 64 may include a plurality of the protruding portions 64 (three in FIG. 22) as a fifth variation of the second embodiment of the present disclosure. As well as the first variation, this variation obtains the advantage of improving productivity in press work.

Here, when the rectangular batteries according to the first embodiment, the second embodiment, and those variations are fabricated as a lithium ion secondary battery, typical examples of materials of the battery will be described.

The battery case 10, the positive electrode lead 22, the sealing plate 60, and the plug 90 are made of a metal such as aluminum or an aluminum alloy. Each of the pair of the battery case 10 and the sealing plate 60, the pair of the sealing plate 60 and the positive electrode lead 22, and the pair of the sealing plate 60 and the plug 90 may be made of different metals.

In the positive electrode, a positive electrode active material layer is formed on both or one of the surfaces of a positive electrode current collector.

The positive electrode current collector is a substrate or a foil made of a conductive material such as aluminum, carbon, or a conductive resin.

The positive electrode active material layer includes a positive electrode active material, a conductive agent, and a binder. The positive electrode active material is a lithium-containing composite oxide represented by, e.g., a general formula: $Li_xM_{1-x}O_2$(M=Co, Ni, Mn, etc.).

The conductive agent may be graphite such as natural graphite or artificial graphite, or may be carbon black such as acetylene black, Ketchen black, lamp black, or thermal black.

The binder is, for example, polyvinylidne fluoride (PVDF), polytetrafluoroethylene, polyethylene, polypropylene, aramid resin, polyamide, or polyimide.

It is preferable to use, e.g., nickel, copper, iron, or stainless steel for the negative electrode lead 21, the current collector plate 40, and the rivet terminal 80.

In the negative electrode, a negative electrode active material layer is formed on both or one of the surfaces of a negative electrode current collector.

The negative electrode current collector may be a metal foil made of, e.g., stainless steel, nickel, copper, or titanium, or may be a thin film made of, e.g., carbon or a conductive resin.

The negative electrode active material layer includes a negative electrode active material. The negative electrode active material may be, for example, a carbon material such as graphite, a metal, such as silicon or tin, which is capable of reversibly inserting and extracting lithium ions, or a compound including such a metal.

A separator may be, for example, polyethylene, polypropylene, a mixture of polyethylene and polypropylene, or a copolymer of ethylene and propylene.

An electrolyte may be a liquid nonaqueous electrolyte containing a nonaqueous solvent and a solute dissolved in the nonaqueous solvent, or may be a polymer electrolyte containing a liquid nonaqueous electrolyte and a high molecular compound.

Such a rectangular battery will be fabricated in accordance with the following method, for example. First, a positive electrode to which the positive electrode lead 22 is connected and a negative electrode to which the negative electrode lead 21 is connected are prepared. Next, the positive electrode and the negative electrode are disposed such that the positive electrode lead 22 and the negative electrode lead 21 extend along the same direction, and are wound with a separator interposed therebetween. At this time, after an electrode group that is substantially circular in cross section is formed, the electrode group may be made flat, or the flat electrode group may be formed by winding the positive electrode, the negative electrode, and the separator around a winding plate (rectangular in cross section). The electrode group 20 having been made in such a manner is housed in the battery case 10, and the insulating plate 30 is provided on the electrode group 20. The rivet terminal 80, the upper insulating gasket 70, the lower insulating gasket 50, and the current collector plate 40 are fixed to the sealing plate 60 to form the assembled sealing body 100. In the assembled sealing body 100, the positive electrode lead 22 is connected to the inner surface side of the sealing plate 60, and the negative electrode lead 21 is connected to the lower surface of the current collector plate 40. Subsequently, the assembled sealing body 100 is disposed at the opening of the battery case 10, and the battery case 10 and the sealing plate 60 are laser welded to seal the battery case 10. Next, after an electrolyte is injected through the liquid inlet 63, the plug 90 is welded to the liquid inlet 63. In this way, the rectangular battery according to the embodiment is fabricated.

In the embodiment, the sealing plate 60 is the external terminal of the positive electrode, and the rivet terminal 80 is the external terminal of the negative electrode. The external terminal of the positive electrode and the external terminal of the negative electrode may be opposite to each other. In this case, the battery case 10, the sealing plate 60, the negative electrode lead 21 connected to the sealing plate 60, and the plug 90 may be made of, e.g., copper, iron or stainless steel. The rivet terminal 80, the current collector plate 40, and the positive electrode lead 22 connected to the current collector plate 40 may be made of, e.g., aluminum or an aluminum alloy.

The rectangular battery according to this embodiment is not limited to the lithium ion secondary battery, and may be an alkaline secondary battery, an alkaline battery, or a lithium primary battery.

EXAMPLES

In the following examples, rectangular lithium ion secondary batteries were fabricated in accordance with a method shown below, and a safety test was performed with respect to the lithium ion secondary batteries.

Example 1

(a) Fabrication of Positive Electrode

As the positive electrode active material, lithium cobaltate ($LiCoO_2$) having an average particle diameter of 10 μm was used. 100 parts by weight of the positive electrode active material, 8 parts by weight of polyvinylidene fluoride (PVDF, binder), 3 parts by weight of acetylene black (conductive material), and an appropriate amount of N-methylpyrrolidone (NMP) were mixed to prepare a positive electrode mixture paste.

Both surfaces of an aluminum foil (positive electrode current collector) having a length of 420 mm, a width of 42 mm, and a thickness of 15 μm were coated with the positive electrode mixture paste, and then, the coated surfaces were dried. This formed a positive electrode active material layer having a thickness of 65 um on each of the surfaces of the aluminum foil. At this time, a part of the aluminum foil was exposed at an end in the longitudinal direction of the fabricated positive electrode, and an end of a lead (positive electrode lead 22) made of aluminum and having a length of 30 mm, a width of 3 mm, and a thickness of 0.1 mm was ultrasonic welded to the exposed part of the aluminum foil.

(b) Fabrication of Negative Electrode

Artificial graphite having an average particle diameter of 20 μm was used as a negative electrode active material. 100 parts by weight of the negative electrode active material, 1 part by weight of styrene-butadiene copolymer (BM-400B produced by ZEON CORPORATION, binder), 1 part by weight of carboxymethylcellulose (thickener), and an appropriate amount of water were mixed to prepare a negative electrode mixture paste.

Both surfaces of a copper foil (negative electrode current collector) having a length of 400 mm, a width of 44 mm, and a thickness of 10 μm were coated with the negative electrode mixture paste, and then, the coated surfaces were dried. This formed a negative electrode active material layer having a thickness of 70 μm on each of the surfaces of the copper foil. At this time, a part of the copper foil was exposed at an end in the longitudinal direction of the fabricated negative electrode, and an end of a lead (negative electrode lead 21) made of nickel and having a length of 30 mm, a width of 3 mm, and a thickness of 0.1 mm was ultrasonic welded to the exposed part of the copper foil.

(c) Preparation of Nonaqueous Electrolyte

To a mixed solvent containing ethylene carbonate and ethyl methyl carbonate in a volume ratio of 1:4, $LiPF_6$ (solute) was dissolved in a concentration of 1.0 mol/L. In this way, the nonaqueous electrolyte was prepared.

(d) Fabrication of Battery

The rectangular batteries were fabricated as follows.

First, the electrode group was fabricated. The positive electrode and the negative electrode were disposed such that the leads extend along the same direction, and the separator made of polyethylene and having a thickness of 20 um was disposed between the positive electrode and the negative electrode. The positive electrode, the negative electrode, and the separator were wound around a flat plate in such a manner that the positive electrode lead 22 constitutes a last wound end and the negative electrode lead 21 constitutes a first wound end.

Next, the assembled sealing body 100 was fabricated. The upper insulating gasket 70 made of PPS was disposed on the upper surface of the sealing plate 60 made of aluminum, and the current collector plate 40 was disposed under the lower surface of the sealing plate 60 with the lower insulating gasket 50 made of PPS interposed therebetween. The terminal through hole 62 formed in the center in the longer side direction of the sealing plate 60 was caulked by the rivet terminal 80 to fix the upper insulating gasket 70, the lower insulating gasket 50, and the current collector plate 40 to the sealing plate 60. Here, the sealing plate 60 illustrated in FIG. 2 described in the first embodiment was used.

The electrode group 20 was housed in the battery case 10 (made of aluminum and having a thickness of 300 μm), and then, the assembled sealing body 100 fabricated as described above was disposed on the electrode group 20 with the insulating plate 30 interposed therebetween. At this time, each of the positive electrode lead 22 and the negative electrode lead 21 was forced through a corresponding one of through holes formed in the insulating plate 30, and the assembled sealing body 100 was disposed at the side of the opening of the battery case 10. Subsequently, the other end of the positive electrode lead 22 was laser welded to the sealing plate 60 and the other end of the negative electrode lead 21 was laser welded to the current collector plate 40. Then, the sealing plate 60 was disposed in the opening of the battery case 10, and the periphery of the sealing plate 60 was laser welded to the battery case 10, thereby sealing the opening of the battery case 10.

After 2.5 g of the nonaqueous electrolyte was injected through the liquid inlet 63 of the sealing plate 60 into the battery case 10, the plug 90 was fit in the liquid inlet 63, and the plug 90 and the sealing plate 60 were welded by laser welding to close the liquid inlet 63.

In this way, a rectangular lithium ion secondary battery having a thickness of 5.2 mm, a height of 50 mm, a width 34 mm, and a design capacity of 900 mAh was fabricated.

Example 2

A rectangular lithium ion secondary battery was fabricated in the same method as the above example 1 except using the sealing plate 60 described in the fifth variation of the first embodiment and illustrated in FIG. 8 as a sealing plate 60.

Example 3

A rectangular lithium ion secondary battery was fabricated in the same method as the above example 1 except using the sealing plate 60 described in the first variation of the first embodiment and illustrated in FIG. 3 as a sealing plate 60.

Example 4

A rectangular lithium ion secondary battery was fabricated in the same method as the above example 1 except using the sealing plate 60 described in the second variation of the first embodiment and illustrated in FIG. 4 as a sealing plate 60.

Example 5

A rectangular lithium ion secondary battery was fabricated in the same method as the above example 1 except using the sealing plate 60 described in the fourth variation of the first embodiment and illustrated in FIG. 7 as a sealing plate 60.

Example 6

A rectangular lithium ion secondary battery was fabricated in the same method as the above example 1 except using the sealing plate 60 described in the second embodiment and illustrated in FIG. 11 as a sealing plate 60.

Example 7

A rectangular lithium ion secondary battery was fabricated in the same method as the above example 1 except using the sealing plate 60 described in the fourth variation of the second embodiment and illustrated in FIG. 19 as a sealing plate 60.

Comparative Example 1

A rectangular lithium ion secondary battery was fabricated in the same method as the above example 1 except using, as a sealing plate, the sealing plate not including the thin portion 61, the thin portion 68, and the guide notch portion 69 by modifying the sealing plate 60 described in the first embodiment and illustrated in FIG. 2.

Comparative Example 2

A rectangular lithium ion secondary battery was fabricated in the same method as the above example 1 except using, as a sealing plate, the sealing plate not including the protruding portion 64 and the notch portion 65 by modifying the sealing plate 60 described in the second embodiment and illustrated in FIG. 11.

<Internal Short Circuit Test Due to Longitudinal Crush>

Ten batteries in each of examples 1-7 and comparative examples 1 and 2 were prepared, and the following evaluation was performed. At an environmental temperature of 25° C., a constant current charge was performed at 0.7 C until a voltage reached 4.2 V, and then, a constant current charge was performed at a voltage of 4.2 V until the current dropped to 0.05 C. Then, at an environmental temperature of 25° C., a flat plate made of SUS was abutted against both side surfaces of shorter sides of each battery in the transverse cross section thereof to compress each of the batteries toward the longer side direction with a force of 13 kN at a rate of 3 mm/sec. Surface temperatures of the batteries were measured 5 seconds after the occurrence of an internal short-circuit. Table 1 shows each result of the average value of the surface temperatures of the ten batteries.

TABLE 1

| | AVERAGE VALUE OF SURFACE TEMPERATURE |
|---|---|
| EXAMPLE 1 | 48.6° C. |
| EXAMPLE 2 | 47.4° C. |
| EXAMPLE 3 | 48.1° C. |
| EXAMPLE 4 | 49.6° C. |
| EXAMPLE 5 | 43.2° C. |
| EXAMPLE 6 | 48.1° C. |
| EXAMPLE 7 | 47.6° C. |
| COMPARATIVE EXAMPLE 1 | 96.7° C. |
| COMPARATIVE EXAMPLE 2 | 96.5° C. |

As shown in Table 1, the surface temperature of the battery in each of the examples is lower than that in each of comparative examples 1 and 2. In particular, in the battery of example 5, the surface temperature rise could be reduced more significantly than the surface temperature rise in each of the other examples. That is because one end of the current collector plate 40 was allowed to protrude toward the side surface direction of the battery case 10 to early cause an internal short-circuit, and as a result, the temperature rise was reduced. In this way, it was confirmed that the batteries of the examples of the present disclosure have an excellent safety.

<Drop Test>

Five batteries in each of examples 1-7 and comparative examples 1 and 2 were prepared, and the following evaluation was performed. Each of the rectangular batteries was dropped ten times from the height of 1.2 m with each of six surfaces of the battery facing downward, and then, it was dropped ten times with each of four corners facing downward. The voltage and the temperature of the batteries after the drop were measured, and were compared with those of the batteries before the drop to confirm whether the voltage was dropped and whether heat was generated. As a result, in all the batteries in examples 1-7 and comparative examples 1 and 2, the voltage was not dropped and heat was not generated.

The test result shows that, since the batteries in examples 1-5 include the thin portion 68 and the guide notch portion 69 and the batteries in examples 6 and 7 include the protruding portion 64 and the notch portion 65, they have a configuration that is likely to cause an internal short-circuit, but they can prevent occurrence of short-circuit failure due to a slight impact, such as drop, with high reliability.

INDUSTRIAL APPLICABILITY

The rectangular battery according to the present disclosure can improve safety, and such a battery is useful as, for example, a power source of mobile electronic equipment such as personal computers, mobile telephones, mobile devices, mobile information terminals, mobile game devices, and video cameras, and a power source for driving, e.g., electric automobiles, electric tools, cleaners, and robots.

DESCRIPTION OF REFERENCE CHARACTERS

10 battery case
20 electrode group
21 negative electrode lead
22 positive electrode lead
30 insulating plate
40 current collector plate
50 lower insulating gasket (insulating member)
60 sealing plate
61 thin portion (lower-strength portion)
62 terminal through hole
63 liquid inlet
64 protruding portion
65 notch portion (lower-strength portion)
66 compression-deformed thin portion
67 compression-deformed notch portion
68 thin portion (lower-strength portion)
69 guide notch portion (guiding portion)
70 upper insulating gasket
80 rivet terminal
90 plug
100 assembled sealing body

The invention claimed is:

1. A rectangular battery in which an electrode group formed by winding a first electrode and a second electrode with a separator interposed therebetween is housed in a battery case having an opening sealed by a sealing plate, wherein the first electrode is electrically connected to the sealing plate, the second electrode is electrically connected to a current collector plate provided between the sealing plate and the electrode group and extending along a longer side direction of the sealing plate, an insulating member is provided between the sealing plate and the current collector plate, the sealing plate has a thin portion which deforms prior to other portions of the sealing plate to provide a contact between the sealing plate and the current collector plate when the sealing plate receives an external pressure along the longer side direction of the sealing plate, when the sealing plate receives the external pressure along the longer side direction of the sealing plate, a strength of the thin portion varies along a shorter side direction of the sealing plate such that the sealing plate is bent around the thin portion toward a direction deviating from a center line extending along the longer side direction of the sealing plate, the thin portion is provided so as to overlap the current collector plate, the sealing plate has a groove recessed to a direction away from the current collector plate, the groove, at a position apart from the thin portion, extending from a center line extending along the longer side direction of the sealing plate toward one end in the shorter side direction of the sealing plate, the insulating member has a protruding portion protruding toward the groove, and fit in the groove, and the strength of the thin portion decreases from a center line extending along the longer side direction of the sealing plate toward at least one end in the shorter side direction of the sealing plate.

2. The rectangular battery of claim 1, wherein the strength of the thin portion decreases from one end toward the other end in the shorter side direction of the sealing plate.

3. The rectangular battery of claim 1, wherein a thickness of the thin portion varies from one end toward the other end in the shorter side direction of the sealing plate.

4. The rectangular battery of claim 1, wherein a length of the thin portion in the longer side direction of the sealing plate varies from one end toward the other end in the shorter side direction of the sealing plate.

5. A rectangular battery in which an electrode group formed by winding a first electrode and a second electrode with a separator interposed therebetween is housed in a battery case having an opening sealed by a sealing plate, wherein the first electrode is electrically connected to the sealing plate, the second electrode is electrically connected to a current collector plate provided between the sealing plate and the electrode group and extending along a longer side direction of the sealing plate, an insulating member is provided between the sealing plate and the current collector plate, the sealing plate has a thin portion which deforms prior to other portions of the sealing plate to provide a contact between the sealing plate and the current collector plate when the sealing plate receives an external pressure along the longer side direction of the sealing plate, when the sealing plate receives the external pressure along the longer side direction of the sealing plate, a strength of the thin portion decreases from a center line extending along the longer side direction of the sealing plate toward at least one end in the shorter side direction of the sealing plate such that the sealing plate is bent around the thin portion toward a direction deviating from a center line extending along the longer side direction of the sealing plate, and the thin portion is provided so as to overlap the current collector plate.

* * * * *